United States Patent Office 3,822,176
Patented July 2, 1974

3,822,176
CARPET UNDERLAY
Alan R. Harrison, 25 Gilloch Crescent,
Dumfries, Scotland
Filed Jan. 8, 1973, Ser. No. 322,038
Claims priority, application Great Britain, Jan. 13, 1972,
1,632/72
Int. Cl. B32b 3/26, 5/18
U.S. Cl. 161—159                    14 Claims

ABSTRACT OF THE DISCLOSURE

Carpet underlay comprising a sheet of creped paper secured to a sheet of cellular rubber, and methods of making this underlay, are disclosed.

Figure 1:
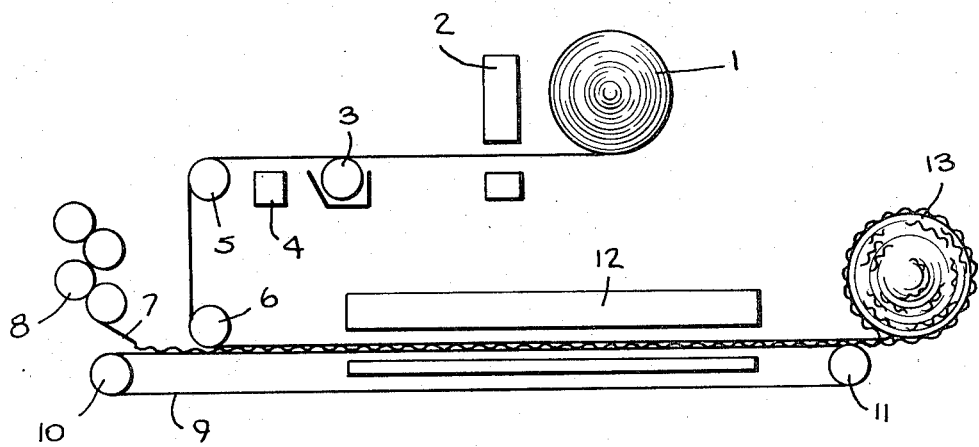

This invention relates to carpet underlay.

Carpet underlays made from foamed or sponge rubber are now rapidly replacing the traditional non-woven felt underlays, and a number of different types of rubber underlays are already known. Generally speaking, these comprise a sheet of foamed or sponge rubber to one surface of which is secured a sheet of a backing material. In use, the backing material is placed uppermost so that it will lie in contact with the carpet, and an exposed rubber surface will lie in contact with the floor. The rubber section of the underday may be made from a dry compound in which the polymer is mixed with a blowing agent and other required compounding ingredients, is sheeted out, and is then heated to cause the blowing agent to decompose and cause the sheet to take on cellular form. In underlays using this type of rubber, the sheet may be flat on both surfaces, or it may be formed to have a three dimensional effect on one or both surfaces, and is then known as a waffle type underlay. Alternatively, the rubber component of the underlay may be formed from a foamed latex of the polymer, the latex being foamed, sheeted out, dried and cured to form a cohesive cellular rubber sheet. In either case, the sheet of backing material may be secured to the rubber sheet by adhesive after the rubber sheet is in its final form, or it may be applied to the rubber during formation of the rubber sheet, and become bonded to the rubber during curing of the rubber. The rubber used in such underlay may be natural or synthetic.

The conventional form of backing for such rubber underlays is a woven sheet of fabric, particularly jute, which will give dimensional stability to the underlay in both directions. Some underlays are also known wherein the backing consists of a non-woven web of fibres in spun bonded form. The present invention is directed to an underlay having a novel form of backing material.

According to the present invention, carpet underlay comprises a sheet of cellular rubber material having secured thereto a sheet of backing material formed by creped paper reinforced with textile fibres.

In an underlay according to the invention, the creped paper base gives enhanced opacity and bulk to the underlay, and the textile fibres give the necessary dimensional stability. Underlay with such backing can be made at a price competitive with conventionally backed underlay, and is considered to be of superior quality to the conventional forms of underlay.

In a first embodiment of the invention, the textile fibres may comprise warp and weft textile fibres, either or both of which is stitched into the paper. The network of warp and weft threads is desirably a non-woven network, the weft threads being laid in parallel form on one surface of the creped paper, and the warp threads being stitched into the paper and securing the weft threads. A non-woven construction of this nature may be just as satisfactory as a woven thread reinforcement for the paper (which the invention also embraces) at a lower cost than the woven construction. In an alternative, the weft threads may be omitted so that the paper is reinforced by stitch-bonding with warp threads only.

In a second embodiment of the invention, the textile fibres may be bonded to the paper by an adhesive. Preferably, the fibres are then in the form of a non-woven fabric laid on one surface of the creped paper to which adhesive has been already applied. Alternatively, warp and weft threads can be laid separately on to the surface of the paper to be held by adhesive on the surface of the paper. In a further alternative, a woven fabric may be bonded to the paper, although non-woven constructions cost less.

The paper used for the backing may be creped in a single direction only, or may be cross-creped. When creped in a single direction, this direction is preferably also the direction of the weft fibres.

Preferably, the textile fibres are polyamide, for example nylon, although other fibres, such as viscose or jute, and mixtures of fibres, may be used.

The weight of the paper used in this backing is not critical. A heavier paper will give a more durable backing of improved appearance, but at greater expense. Acceptable results have been obtained with papers having weights of 40 g. and 60 g. per square meter before creping, and 60 g. and 80 g. per square meter, respectively, after creping. However, papers of both lower and higher weights can be used. The creped paper may be printed, dyed and treated with additives giving any desired properties such as water repellency, flame resistance and anti-mildew properties. Conventional backing materials such as jute may be similarly treated, but it is found that substantially less of the additives are necessary to provide the desired properties in the paper backing of the invention.

Underlay according to the invention may have the rubber component of the underlay formed in any of the conventional ways, and this may thus be a plane or waffle-type sheeted sponge rubber or a rubber layer formed from a foamed latex.

Figure 2:
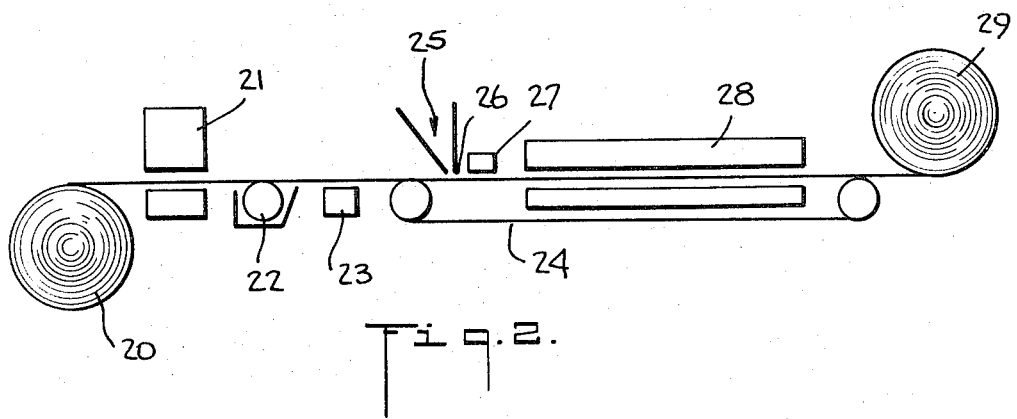

Specific embodiments of underlay according to the invention will now be described in more detail, by way of example only, with reference to the accompanying drawings in which:

FIG. 1 shows schematically apparatus for making a first embodiment of underlay; and FIG. 2 shows schematically apparatus for making a second embodiment of underlay.

Referring now to FIG. 1, in a first embodiment of the invention creped paper manufactured in the conventional manner and weighing 60 g. per square meter before creping and 80 g. per square meter after creping is fed from a reel 1 into a Malimo stitching machine 2. In this machine, a plurality of parallel weft fibres of second grade continuous filament 250-denier nylon are laid onto the upper surface of the creped paper parallel to the direction of creping and warp yarn of medium tenacity 250-denier nylon 6 is stitched into the paper over the weft fibre. A light coat of an acrylic resin, preferably an aqueous anionic acrylic copolymer dispersion known as Acronal 500D, is applied to the stitched threads by a lick roller 3. The lick roller applies the minimum quantity of resin exactly where it is most required, i.e. on the high points of the fabric construction formed by the stitching threads, and the weight of solids per sqaure meter of resin applied to the paper may be less than 10 g. The resin is applied only to the face of the fabric which has the stitched warp threads.

The acrylic resin is dried by an infra-red heater 4, and the paper then passes around rollers 5 and 6 to be laid on top of a sheet of rubber 7 compounded with a blowing agent and received from a calender 8 and laid on a perforated endless carrier 9 running between end rollers 10 and 11. The roller 6 presses the paper backing sheet to the rubber sheet, and this composite structure passes into an oven 12 to activate the blowing agent and cure the rubber, to which the backing will then adhere. The oven temperature must be sufficiently high to cure the rubber, but not high enough to cause any degradation of the backing material. After cure, the composite structure is removed from the carrier 9 and wound up on take-up reel 13.

The resultant product is a waffle type rubber sheet having a textile-reinforced backing bonded thereto, so forming a carpet underlay.

The waffle type rubber sheet is produced because of the perforations in the endless carrier 9. The method described above can also be used to provide a paper backing on a plane sheet of sponge rubber delivered by the calender onto a conveyor having a continuous surface.

In an alternative embodiment, crepe paper is fed from reel 20 (FIG. 2) into a Malimo stitching machine 21 where textile fibres are incorporated with the paper as already described. The paper then passes over a lick roller 22 applying a coat of acrylic resin and past an infra-red heater 23 to dry the acrylic resin. The paper is then supported by an endless conveyor 24, and passes beneath a reservoir 25 of foamed latex which is spread onto the paper, the thickness of the layer being controlled by a doctor blade 26. The sheet is then passed under an infra-red heater 27 to gel the wet foam, and into an oven 28 to cure the rubber to which the paper backing will then adhere. On leaving the oven, the rubber sheet with the paper backing adhering thereto is removed from the conveyor and wound up on a takeup reel 29.

Either of the methods described may be varied by applying the acrylic resin to the paper sheet by spraying or brushing rather than by the lick roller 3 or 22. However, the lick roller is preferred as spraying or brushing would apply an overall coat of higher weight without any added advantage. The resin may be applied to the face of the paper opposite to that shown or may be applied to both faces if required. Resins other than acrylic resins may be used; for example, an internally plasticised polyvinyl acetate latex or carboxylated styrene-butadiene latex is suitable. Other latexes will also give the desired result of locking the stitching threads. Although a Malimo stitching machine has been described, other forms of stitching equipment can be used.

The methods described in the foregoing paragraphs have all relied on the curing of the rubber sheet with paper backing already in contact so that bonding of the paper to the rubber occurs at the same time as curing. However, this is not necessary; the rubber sheet may be formed and fully cured before application of the paper backing. In this arrangement, an adhesive which is preferably a latex adhesive can be applied to the paper backing, the rubber sheet, or both, in advance of a pressure roller at which the rubber sheeting and the paper backing are brought together in a continuous manner. The latex adheres the two sheets together; after the latex dries, the resulting laminate can be wound up onto a reel. The rubber sheet may be a waffle-type sheet, or a plane sheet of rubber formed either by calendering, or by spreading a foamed latex onto a carrier.

In the methods particularly described above, the paper backing comprises a creped paper sheet reinforced with warp and weft textile fibres, the warp fibres being stitched into the paper. The paper backing may, however, be made in alternative ways; in a further embodiment, this backing is formed by providing a conventionally manufactured creped paper of 80 g. per square meter after creping and coating this one surface with an acrylic or latex adhesive. Although the adhesive coat could be applied by spraying or brushing techniques, use of a lick roller is preferred as this applies the required quantity of adhesive in a substantially even coat. By using a lick roller, the weight of solids per square meter of adhesive applied to the paper can be accurately controlled, and may be from about 20 g. to 40 g.

The reinforcing fabric is then laminated on to the paper by bringing the fabric on to the paper and passing the two sheets between rollers applying a light pressure to the construction. The material is then passed around calender rollers to dry the adhesive. The adhesive may, for example, be an internally plasticised polyvinyl acetate latex or may be a carboxylated styrenebutadiene latex. Other latices will also give the required result. The fabric is desirably a non-woven fabric of the spun bonded type or a lightweight fibre web which may be reinforced by fibre strands as in a needling operation, for example on the Arabeva system, or by forming a knit construction, e.g. using the Raschel knitting machine or by using binding thread on the Arachne or Mali system.

This alternative paper structure may be combined with a rubber sheet in any of the ways described above.

In any of the methods described the stitched paper backing may be treated to give any desired properties. For example, the backing may be made water repellent by treatment with a urea-formaldehyde resin or a wax emulsion. The backing may be made fire repellent by treating with a solution of tetrahydroxyethyl phosphonium chloride or with Flammex BT, a salt solution containing nitrogen, phosphorous and bromine. Mildew resistance may be imparted to the backing by treating this with a phenol or chlorinated phenol. These and other forms of treatment giving similar results are well known. Preferably any such treatment is carried out before the stitching operation, desirably in the actual paper making operation. However, the treatment could be effected after stitching, the paper may also be printed or dyed.

In all of the methods described, the product is a carpet underlay comprising a sheet of cellular rubber to which is secured a backing formed of creped paper reinforced by stitched fibres.

What is claimed is:

1. Carpet underlay comprising a sheet of cellular rubber material having secured thereto a sheet of backing material formed by creped paper reinforced with textile fibres.

2. Carpet underlay according to claim 1 in which the textile fibres comprise warp and weft textile fibres, either or both of which are stitched into the paper.

3. Carpet underlay according to claim 2 in which the network of warp and weft threads is a nonwoven network.

4. Carpet underlay according to claim 3 in which only the warp threads are stitched into the paper.

5. Carpet underlay according to claim 1 in which the textile fibres are bonded to the paper by an adhesive.

6. Carpet underlay according to claim 5 in which the textile fibres are in the form of a non-woven fabric.

7. Carpet underlay according to claim 1 in which the paper is creped in a single direction only.

8. Carpet underlay according to claim 1 in which the creped paper has a weight of 40 g. to 60 g. per square meter before creping and 60 g. to 80 g. per square meter after creping.

9. Carpet underlay according to claim 1 in which the rubber sheet is a plane sheeted sponge rubber.

10. Carpet underlay according to claim 1 in which the rubber sheet is a waffle-type sheeted sponge rubber.

11. Carpet underlay according to claim 1 in which the rubber sheet is a rubber layer formed from a foamed latex.

12. A method of making a carpet underlay according to claim 1, comprising providing a sheet of backing material constituted by creped paper reinforced with textile fibres, providing a sheet of cured cellular rubber material and adhering the backing material to the rubber material.

13. A method of making a carpet underlay according to claim 1, comprising forming an unvulcanized sheet of rubber compounded with a blowing agent, bringing a sheet of backing material constituted by creped paper reinforced with textile fibres into contact with a surface of the rubber sheet and heating the composite to activate the blowing agent, cure the rubber and cause the backing sheet to become bonded to the rubber.

14. A method of making a carpet underlay according to claim 1, comprising forming a layer of wet foamed rubber latex, bringing a surface of said layer into contact with a backing sheet constituted by creped paper reinforced with textile fibres, and gelling and curing the rubber whereupon the backing sheet becomes bonded to the rubber.

References Cited
UNITED STATES PATENTS

| | | | |
|---|---|---|---|
| 1,865,345 | 6/1932 | Wheatley | 161—159 |
| 2,628,928 | 2/1953 | Cadous | 161—159 |
| 3,519,526 | 7/1970 | Carey et al. | 161—67 |

WILLIAM J. VAN BALEN, Primary Examiner

U.S. Cl. X.R.

156—72, 148, 306; 161—67, 160, 244, 250